(12) United States Patent
Nakajo

(10) Patent No.: US 7,138,647 B2
(45) Date of Patent: Nov. 21, 2006

(54) IMAGE READING APPARATUS

(75) Inventor: Masakazu Nakajo, Minami-ashigara (JP)

(73) Assignee: Fuji Photo Film Co., Ltd, Kanagawa-ken (JP)

( * ) Notice: Subject to any disclaimer, the term of this patent is extended or adjusted under 35 U.S.C. 154(b) by 0 days.

(21) Appl. No.: 11/385,701

(22) Filed: Mar. 22, 2006

(65) Prior Publication Data

US 2006/0214124 A1 Sep. 28, 2006

(30) Foreign Application Priority Data

Mar. 23, 2005 (JP) .............................. 2005-084573

(51) Int. Cl.
*G01N 23/04* (2006.01)
(52) U.S. Cl. ..................... 250/588; 250/580; 250/581; 250/589; 250/591
(58) Field of Classification Search ................ 250/580, 250/581, 584, 585, 586, 588, 589, 590
See application file for complete search history.

(56) References Cited

U.S. PATENT DOCUMENTS 7,075,101 B1 * 7/2006 Iiyama ..................... 250/589

2004/0089826 A1 * 5/2004 Yonekawa .................. 250/584
2006/0060803 A1 * 3/2006 Ishikawa et al. ............. 250/584
2006/0060804 A1 * 3/2006 Ohtsuka et al. .............. 250/589

FOREIGN PATENT DOCUMENTS

JP 11-160817 A 6/1999
JP 2002-156716 A 5/2002

* cited by examiner

*Primary Examiner*—David Porta
*Assistant Examiner*—David S. Baker
(74) *Attorney, Agent, or Firm*—Sughrue Mion, PLLC

(57) ABSTRACT

An image reading apparatus includes a casing having a side panel which has a cassette loading slot defined therein for loading a cassette therein. A stimulable phosphor sheet stored in the cassette loaded in the cassette loading slot is removed from the cassette and fed vertically downwardly along a first vertical feed path. Radiation image information recorded in the stimulable phosphor sheet is read by a reader. Thereafter, the stimulable phosphor sheet is stored back into the cassette, which is then delivered toward a cassette unloading slot by a sliding displacement mechanism. The stimulable phosphor sheet is removed again from the cassette, and fed along a second vertical feed path for an eraser to erase remaining radiation image information from the stimulable phosphor sheet.

8 Claims, 3 Drawing Sheets

IMAGE READING APPARATUS

BACKGROUND OF THE INVENTION

1. Field of the Invention

The present invention relates to an image reading apparatus for reading radiation image information recorded on a radiation image recording medium that is held in a cassette and thereafter erasing radiation image information remaining on the radiation image recording medium.

2. Description of the Related Art

There has heretofore been known an image reading apparatus employing a stimulable phosphor sheet which, when exposed to an applied radiation, stores part of the energy of the radiation, and, when subsequently exposed to applied stimulating rays such as visible light, emits light in proportion to the stored energy of the radiation.

The image reading apparatus includes a cassette loader for loading a cassette storing a stimulable phosphor sheet which records therein radiation image information of a subject such as a human body, a reader for applying stimulating light to the stimulable phosphor sheet removed from the cassette to read the radiation image information from the stimulable phosphor sheet, and an eraser for applying erasing light to the stimulable phosphor panel from which the radiation image information has been read to erase remaining radiation image information from the stimulable phosphor sheet. The removed stimulable phosphor sheet from which the remaining radiation image information has been erased is returned into the cassette and then discharged, while being stored in the cassette, out of the image reading apparatus to be used again.

One such image recording apparatus is disclosed in Japanese Laid-Open Patent Publication No. 11-160817. According to the disclosed image recording apparatus, a plate holder for holding a stimulable phosphor plate is disposed substantially vertically in the image recording apparatus, and a reader for reading radiation image information and an eraser for erasing remaining radiation image information are disposed in parallel with each other in confronting relation to the plate holder. The stimulable phosphor plate is fed along the plate holder to a position facing the reader, in which the reader reads the radiation image information recorded in the stimulable phosphor plate. Thereafter, the stimulable phosphor plate is delivered to a position facing the eraser, in which the eraser erases the remaining radiation image information from the stimulable phosphor plate.

Japanese Laid-Open Patent Publication No. 2002-156716 discloses an image reading apparatus having a cassette inserter and discharger which is inclined at a certain angle on a side panel of an apparatus casing. When a cassette is loaded in the cassette inserter and discharger, a frame of the cassette is removed, and an exposed stimulable phosphor sheet stored in the cassette is fed by a feed means into the apparatus casing. Thereafter, the stimulable phosphor sheet is fed vertically upwardly by an auxiliary scanning means disposed in the apparatus casing. A reading means that is disposed along the auxiliary scanning means then reads radiation image information recorded in the stimulable phosphor sheet. Remaining radiation image information is subsequently erased from the stimulable phosphor sheet by an erasing means that is disposed below the reading means.

In the image reading apparatus disclosed in Japanese Laid-Open Patent Publication No. 11-160817 and Japanese Laid-Open Patent Publication No. 2002-156716, the reader for reading radiation image information and the eraser for erasing remaining radiation image information are vertically disposed in parallel with each other, and the stimulable phosphor plate or sheet is fed vertically along the reader and the eraser. Therefore, the stimulable phosphor plate or sheet needs to be fed along a long vertical feed path in the apparatus casing, which necessarily makes the image reading apparatus large in vertical dimension.

There has been a demand in the art for quick and efficient processes for reading and erasing radiation image information from stimulable phosphor sheets in image reading apparatus.

SUMMARY OF THE INVENTION

It is a general object of the present invention to provide an image reading apparatus which has a relatively small apparatus casing and which is capable of effectively performing reading and erasing processes by increasing the efficiency with which to load cassettes that store radiation image recording mediums.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
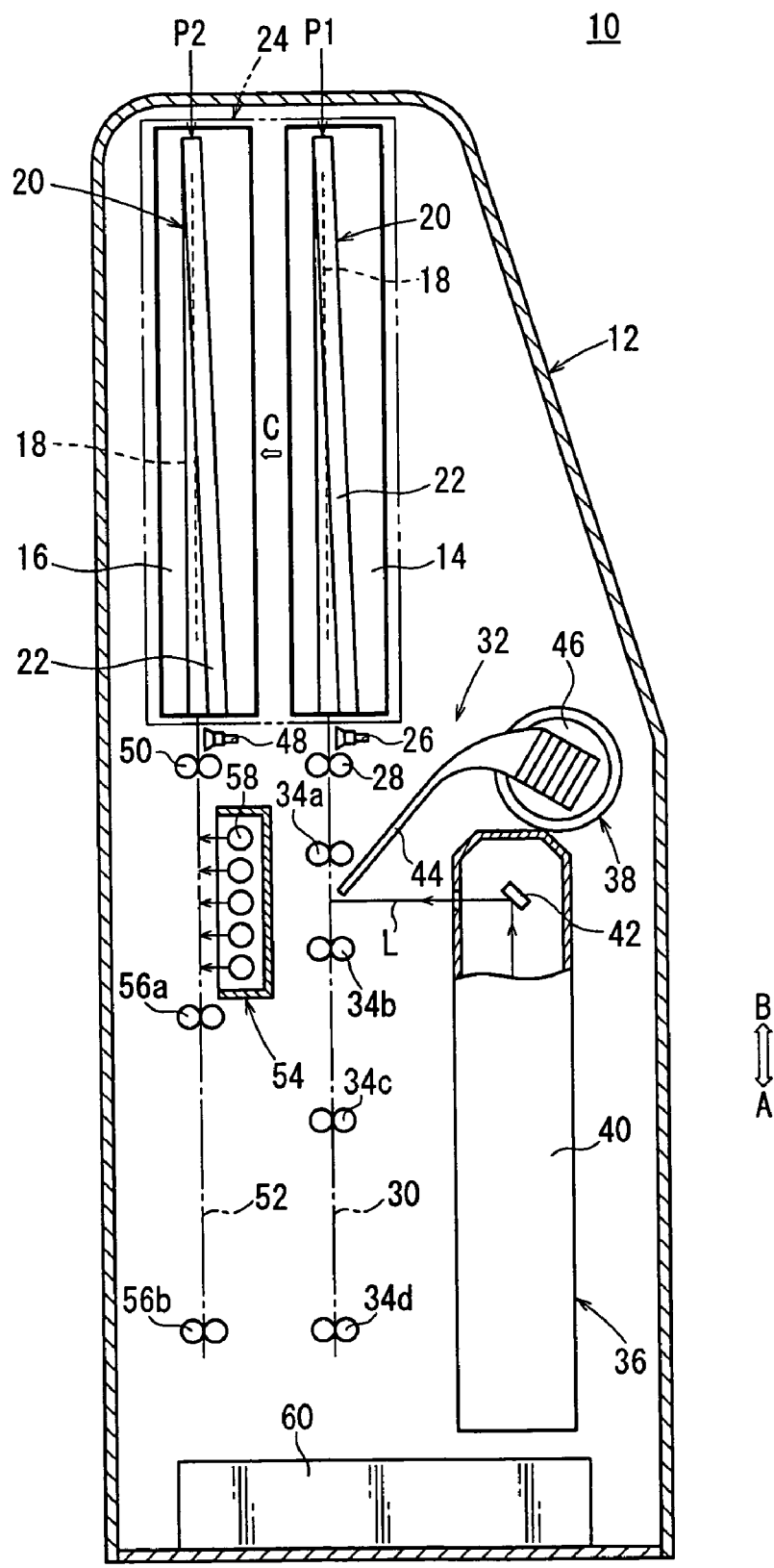
FIG. 1 is a schematic vertical cross-sectional view of an image reading apparatus according to a first embodiment of the present invention.

FIG. 1 shows in schematic vertical cross section an image reading apparatus 10 according to a first embodiment of the present invention.

As shown in FIG. 1, the image reading apparatus 10 includes a casing 12 having a cassette loading slot (cassette loader) 14 and a cassette unloading slot (cassette unloader) 16 which are defined in a side panel of the casing 12. A cassette 20 storing a stimulable phosphor sheet (radiation image recording medium) 18 which records radiation image information therein is loaded into the cassette loading slot 14. A cassette 20 storing a stimulable phosphor sheet 18 which has been processed in the casing 12 is discharged into the cassette unloading slot 16. According to the present embodiment, each of the cassettes 20 has a side wall serving as a movable lid 22 to open and close the cassette 20 for removing the stimulable phosphor sheet 18 from the cassette 20 and placing the stimulable phosphor sheet 18 into the cassette 20.

The cassette loading slot 14 is in the form of a rectangular opening that is elongate in the vertical direction indicated by the arrows A, B of the casing 12. The cassette 20 is inserted from one side of the casing 12 through the cassette loading slot 14 into the casing 12. The opening of the cassette loading slot 14 is of a size greater than the outer profile of the cassette 20, i.e., the length and thickness of the cassette 20. The cassette 20 is inserted into the cassette loading slot 14 in such an orientation that the cassette 20 will be open downwardly in the direction indicated by the arrow A when the lid 22 is opened.

After the cassette 20 is inserted into the cassette loading slot 14, the lid 22 of the cassette 20 is opened by a lid opening mechanism (not shown) disposed in the casing 12 near the cassette loading slot 14. Therefore, the cassette 20 is open downwardly in the direction indicated by the arrow A. At this time, the stimulable phosphor sheet 18 stored in the cassette 20 is retained in the cassette 20 by a lock mechanism (not shown). Therefore, the stimulable phosphor sheet 18 is prevented from being accidentally dislodged from the cassette 20 when the lid 22 is opened.

The cassette unloading slot 16 is laterally spaced a certain distance from the cassette loading slot 14 and extends substantially parallel to the cassette loading slot 14. The cassette unloading slot 16 is also in the form of a rectangular opening that is substantially identical in form to the cassette loading slot 14.

The casing 12 houses therein a sliding displacement mechanism (delivery mechanism) 24 for moving a cassette 20 inserted in the cassette loading slot 14 to the cassette unloading slot 16. The sliding displacement mechanism 24 is disposed in an upper region of the casing 12 between the cassette loading slot 14 and the cassette unloading slot 16. The sliding displacement mechanism 24 is capable of sliding the cassette 20 to substantially horizontally displace from the cassette loading slot 14 to the cassette unloading slot 16 in the direction indicated by the arrow C.

The image reading apparatus 10 has a first suction cup 26 disposed in the casing 12 near the cassette loading slot 14, for attracting and removing the stimulable phosphor sheet 18 from the cassette 20 whose lid 22 has been open in the cassette loading slot 14, and first nip rollers 28 disposed beneath the first suction cup 26 in the casing 12, for gripping and feeding the stimulable phosphor sheet 18 taken from the cassette 20 by the first suction cup 26. The stimulable phosphor sheet 18 taken from the cassette 20 will be fed vertically along a first vertical feed path (first feed path) 30 extending vertically downwardly in the direction indicated by the arrow A from the cassette loading slot 14 contiguously to the first nip rollers 28. The image reading apparatus 10 also has a reader 32 housed in the casing 12 and extending along the first vertical feed path 30.

A plurality of roller pairs 34a, 34b, 34c, 34d are disposed at vertically spaced intervals along the first vertical feed path 30. The roller pairs 34a through 34d are rotatable by an actuating means (not shown) for feeding the stimulable phosphor sheet 18 supplied from the cassette 20 to a desired position.

The reader 32 comprises a scanning unit 36 for emitting a laser beam L as stimulating light and applying the laser beam L to the stimulable phosphor sheet 18 to scan the stimulable phosphor sheet 18, and a reading unit 38 for photoelectrically reading light that is emitted from the stimulable phosphor sheet 18 when the stimulable phosphor sheet 18 is irradiated with the laser beam L.

The scanning unit 36 comprises a laser oscillator 40 for generating the laser beam L and a reflecting mirror 42 for reflecting the generated laser beam L to the stimulable phosphor sheet 18. The laser beam L emitted from the scanning unit 36 is applied to the stimulable phosphor sheet 18 at a position between the roller pair 34a and the roller pair 34b. The reader 32 may also have a focusing optical system, not shown, for focusing the laser beam L onto the stimulable phosphor sheet 18.

The reading unit 38 is disposed closely to the scanning unit 36. The reading unit 38 comprises a light guide 44 having an end disposed near the stimulable phosphor sheet 18 between the roller pair 34a and the roller pair 34b, and a photomultiplier 46 coupled to the other end of the light guide 44 for converting light emitted from the stimulable phosphor sheet 18 into an electric signal.

The image reading apparatus 10 further has a second suction cup 48 disposed in the casing 12 near the cassette unloading slot 16, for attracting and removing the stimulable phosphor sheet 18 from the cassette 20 whose lid 22 has been open in the cassette unloading slot 16, and second nip rollers 50 disposed beneath the second suction cup 48 in the casing 12, for gripping and feeding the stimulable phosphor sheet 18 taken from the cassette 20 by the second suction cup 48. The stimulable phosphor sheet 18 taken from the cassette 20 will be fed vertically along a second vertical feed path (second feed path) 52 extending vertically downwardly in the direction indicated by the arrow A from the cassette unloading slot 16 contiguously to the second nip rollers 50. The image reading apparatus 10 also has an eraser 54 housed in the casing 12 and extending along the second vertical feed path 52. The second vertical feed path 52 extends substantially parallel to the first vertical feed path 30.

A plurality of roller pairs 56a, 56b are disposed at vertically spaced intervals along the second vertical feed path 52. The roller pairs 56a, 56b are rotatable by an actuating means (not shown) for feeding the stimulable phosphor sheet 18 supplied from the cassette 20 to a desired position.

The eraser 54 is disposed between the second nip rollers 50 and the roller pair 56a for removing radiation energy remaining in the stimulable phosphor sheet 18 from which desired radiation image information has been read by the reader 32. The eraser 54 comprises a plurality of erasing light sources 58 such as halogen lamps or the like. The erasing light sources 58 emit erasing light that is applied to the stimulable phosphor sheet 18 from which desired radiation image information has been read, thereby erasing remaining radiation image information from the stimulable phosphor sheet 18.

A controller 60 is disposed on a lower panel of the casing 12 for controlling various processes performed in the casing 12, storing read image data and outputting the stored image data to an output unit such as a display unit, a printer, for example, and a network.

The image reading apparatus 10 according to the first embodiment of the present invention is basically constructed as described above. Operation and advantages of the image reading apparatus 10 will be described below.

Radiation image information of a subject which has been captured by an image capturing device (not shown) is recorded in a stimulable phosphor sheet 18, and the stimulable phosphor sheet 18 is stored in a cassette 20. The operator manually loads the cassette 20 from one side of the casing 12 into the cassette loading slot 14. Specifically, the operator loads the cassette 20 into the cassette loading slot 14 in such an orientation that the cassette 20 will be open downwardly in the direction indicated by the arrow A when the lid 22 is opened. When the cassette 20 is loaded into the cassette loading slot 14, the cassette 20 is held in a first cassette holding position P1 where the cassette 20 and the first vertical feed path 30 are in substantially vertical alignment with each other.

After the cassette 20 has been loaded into the cassette loading slot 14, the lid 22 of the cassette 20 is opened by the lid opening mechanism in the casing 12, making the cassette 20 open downwardly. At this time, since the stimulable phosphor sheet 18 is retained in the cassette 20 by the lock mechanism, the stimulable phosphor sheet 18 is prevented from being dislodged from the cassette 20 when the lid 22 is opened.

Then, the first suction cup 26 is moved into the cassette 20, and attracts the stimulable phosphor sheet 18 under suction. The stimulable phosphor sheet 18 is then unlocked by the lock mechanism, and the first suction cup 26 which is attracting and holding the stimulable phosphor sheet 18 is moved out of the cassette 20 toward the first nip rollers 28 until the lower end of the stimulable phosphor sheet 18 is gripped by the first nip rollers 28. Then, the first suction cup 26 releases the stimulable phosphor sheet 18. The stimulable phosphor sheet 18 is now fed vertically downwardly along the first vertical feed path 30 in the direction indicated by the arrow A by the first nip rollers 28 and the roller pairs 34a through 34d.

While the stimulable phosphor sheet 18 is being fed vertically downwardly in the direction indicated by the arrow A, i.e., in an auxiliary scanning direction, the laser beam L emitted from the scanning unit 36 is applied to the recording surface of the stimulable phosphor sheet 18. At this time, the laser beam L scans the stimulable phosphor sheet 18 in a main scanning direction. When the laser beam L is applied to the stimulable phosphor sheet 18, the stimulable phosphor sheet 18 emits light representative of the recorded radiation image information. The light thus emitted from the stimulable phosphor sheet 18 is photoelectrically read by the reading unit 38. The radiation image information thus read by the reading unit 38 while the stimulable phosphor sheet 18 is being fed vertically downwardly in the direction indicated by the arrow A is referred to as pre-read radiation image information. The pre-read radiation image information can be displayed for confirmation on a display unit (not shown), for example, which is connected to the image reading apparatus 10.

After the pre-read radiation image information is obtained upon the downward travel of the stimulable phosphor sheet 18, the actuating means coupled to the roller pairs 34a through 34d is reversed to feed the stimulable phosphor sheet 18 vertically upwardly in the direction indicated by the arrow B. While the stimulable phosphor sheet 18 is being fed vertically upwardly in the direction indicated by the arrow B, the scanning unit 36 applies the laser beam L again to scan the stimulable phosphor sheet 18. The stimulable phosphor sheet 18 emits light representative of the recorded radiation image information, and the reading unit 38 reads the radiation image information in detail.

After the detailed radiation image information is read from the stimulable phosphor sheet 18 by the reading unit 38, the stimulable phosphor sheet 18 is placed back into the cassette 20 whose lid 22 has been opened by the first suction cup 26, and retained in the cassette 20 by the lock mechanism.

The cassette 20 with the stimulable phosphor sheet 18 stored again therein and also with the lid 22 being open is moved substantially horizontally a predetermined distance from the cassette loading slot 14 to the cassette unloading slot 16 in the direction indicated by the arrow C by the sliding displacement mechanism 24, and stopped when displaced to a position facing the cassette unloading slot 16. Specifically, the cassette 20 reaches a second cassette holding position P2 facing the cassette unloading slot 16 and where the cassette 20 and the second vertical feed path 52 are in substantially vertical alignment with each other and the cassette 20 is open downwardly in the direction indicated by the arrow A. In the description which follows, it is assumed that the cassette 20 loaded into the cassette loading slot 14 is displaced to the second cassette holding position P2 facing the cassette unloading slot 16.

After the cassette 20 has been moved to the cassette unloading slot 16 in the direction indicated by the arrow C by the sliding displacement mechanism 24, another cassette can be loaded into the cassette loading slot 14, and the radiation image information recorded in the stimulable phosphor sheet 18 stored in the newly loaded other cassette can be read by the reader 32. Therefore, the image reading apparatus 10 can be simultaneously loaded with a maximum of two cassettes 20.

Then, the second suction cup 48 is moved into the open cassette 20, and attracts the stimulable phosphor sheet 18 in the cassette 20 under suction. The stimulable phosphor sheet 18 is then unlocked by the lock mechanism, and the second suction cup 48 which is attracting and holding the stimulable phosphor sheet 18 is moved out of the cassette 20 toward the second nip rollers 50 in the direction indicated by the arrow A until the lower end of the stimulable phosphor sheet 18 is gripped by the second nip rollers 50. Then, the second suction cup 48 releases the stimulable phosphor sheet 18. The stimulable phosphor sheet 18 is now fed vertically downwardly along the second vertical feed path 52 in the direction indicated by the arrow A by the second nip rollers 50 and the roller pairs 56a, 56b.

While the stimulable phosphor sheet 18 is being fed vertically downwardly along the second vertical feed path 52, the erasing light sources 58 of the eraser 54 emit and apply erasing light to the stimulable phosphor sheet 18, thereby erasing remaining radiation image information from the stimulable phosphor sheet 18. After the remaining radiation image information has been erased from the stimulable phosphor sheet 18, the actuating means coupled to the roller pairs 56a, 56b is reversed to feed the stimulable phosphor sheet 18 vertically upwardly toward the cassette 20 in the direction indicated by the arrow B. While the stimulable phosphor sheet 18 is being fed vertically upwardly in the direction indicated by the arrow B, any remaining radiation image information is fully erased from the stimulable phosphor sheet 18 by the eraser 54. Thereafter, the stimulable phosphor sheet 18 is delivered back into the cassette 20 in the cassette unloading slot 16 by the roller pairs 56a, 56b and the second suction cup 48, and retained in the cassette 20 again by the lock mechanism.

Finally, after the stimulable phosphor sheet 18 has been stored in the cassette 20 in the cassette unloading slot 16, the lid 22 of the cassette 20 is closed by a lid closing mechanism (not shown) that is disposed in the casing 12 near the cassette unloading slot 16. Then, the operator removes the cassette 20 through the cassette unloading slot 16 out of the casing 12.

According to the first embodiment, as described above, the reader 32 for reading radiation image information recorded in the stimulable phosphor sheet 18 and the eraser 54 for erasing remaining radiation image information from the stimulable phosphor sheet 18 are disposed parallel to each other in a substantially horizontal direction in the casing 12. With this arrangement, after radiation image information recorded in the stimulable phosphor sheet 18 has been read by the reader 32 disposed along the first vertical feed path 30, the stimulable phosphor sheet 18 can be moved substantially horizontally to the second vertical feed path 52 combined with the eraser 54 by the sliding displacement mechanism 24 and sent to the eraser 54 for erasing remaining radiation image information from the stimulable phosphor sheet 18.

Specifically, since the reader 32 and the eraser 54 are disposed parallel to each other, rather than being held in substantial alignment with each other in the conventional image reading apparatus, the first and second vertical feed paths 30, 52 for feeding the stimulable phosphor sheet 18 therealong are relatively small in length. As a result, the height of the casing 12 is relatively small, and hence the size of the image reading apparatus 10 is relatively small.

Furthermore, the casing 12 has the cassette loading slot 14 for inserting the cassette 20 therein and the cassette unloading slot 16 for removing the cassette 20 therefrom. After the radiation image information recorded in the stimulable phosphor sheet 18 that is stored in the cassette 20 has been read, the cassette 20 is displaced from the cassette loading slot 14 to the cassette unloading slot 16 in the direction indicated by the arrow C by the sliding displacement mechanism 24. Consequently, after the cassette 20 has been displaced from the cassette loading slot 14 to the cassette unloading slot 16 in the direction indicated by the arrow C, the cassette loading slot 14 can be loaded with another cassette, and the radiation image information recorded in the stimulable phosphor sheet 18 stored in the newly loaded other cassette can be read by the reader 32. Therefore, the single image reading apparatus 10 can be simultaneously loaded with two cassettes 20 for reading recorded radiation image information from the stimulable phosphor sheet 18 stored in one of the two cassettes 20 and erasing remaining radiation image information from the stimulable phosphor sheet 18 stored in the other of the two cassettes 20. As a result, the efficiency with which to load cassettes 20 into the image reading apparatus 10 is increased, allowing the image reading apparatus 10 to read and erase radiation image information efficiently.

The cassette 20 is of a structure for being loaded into the casing 12 through the cassette loading slot 14 and unloaded from the casing 12 through the cassette unloading slot 16. Therefore, the cassette 20 should be made of a shield material capable of blocking the transmission of X-rays therethrough, and each of the cassette loading slot 14 and the cassette unloading slot 16 should be combined with a cover (not shown) for preventing X-rays from entering the cassette loading slot 14 and the cassette unloading slot 16, thereby providing a shield structure in the image reading apparatus 10. The image reading apparatus 10 with such a shield structure can be located near an image forming apparatus for recording radiation image information in stimulable phosphor sheets 18. Accordingly, stimulable phosphor sheets 18 in which radiation image information has been recorded by the image forming apparatus can quickly and efficiently be processed by the image reading apparatus 10.

Figure 2:
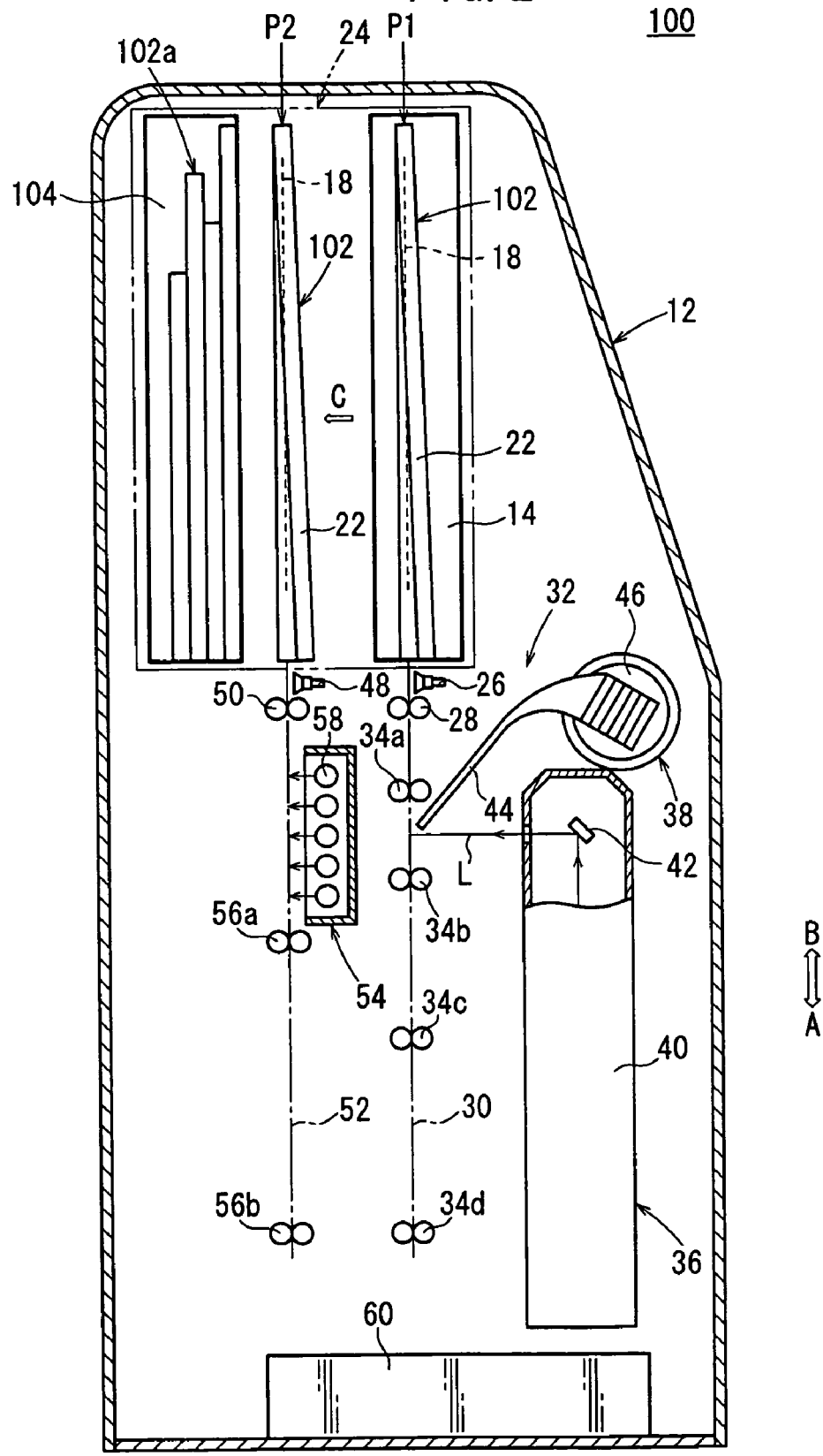
FIG. 2 is a schematic vertical cross-sectional view of an image reading apparatus according to a second embodiment of the present invention.

An image reading apparatus 100 according to a second embodiment of the present invention is shown in FIG. 2. Those parts of the image reading apparatus 100 which are identical to those of the image reading apparatus 10 according to the first embodiment are denoted by identical reference characters, and will not be described in detail below.

The image reading apparatus 100 according to the second embodiment differs from the image reading apparatus 10 according to the first embodiment in that a cassette unloading slot 104 defined in the casing 12 is capable of storing a plurality of, e.g., four, cassettes 102 at the same time.

In the image reading apparatus 100, the cassette unloading slot 104 is disposed substantially parallel to the cassette loading slot 14 in the horizontal direction, and has a width increased a predetermined dimension in a direction (indicated by the arrow C) away from the cassette loading slot 14. The cassette unloading slot 104 is displaced toward an inner wall surface of the casing 12 in the direction indicated by the arrow C from the second cassette holding position P2 which is held in substantial alignment with the second vertical feed path 52 for holding a cassette 102 to be sent for the erasing process.

The image reading apparatus 100 thus constructed operates as follows: A cassette 102 that is loaded into the cassette loading slot 14 and placed in the first cassette holding position P1. After the lid 22 of the cassette 102 has been opened, a stimulable phosphor sheet 18 with recorded radiation image information is removed from the cassette 102 in the first cassette holding position P1, and fed along the first vertical feed path P1. Then, the radiation image information recorded in the stimulable phosphor sheet 18 is read by the reader 32. Thereafter, the stimulable phosphor sheet 18 is stored again into the cassette 102, which is then delivered substantially horizontally in the direction indicated by the arrow C toward the cassette unloading slot 104 by the sliding displacement mechanism 24.

When the cassette 102 reaches the second cassette holding position P2 which is held in substantial alignment with the second vertical feed path 52, the cassette 102 stops being delivered. With the cassette 102 being held in the second cassette holding position P2, the stimulable phosphor sheet 18 is removed from the cassette 102 and then fed along the second vertical feed path 52. After remaining radiation image information has been erased from the stimulable phosphor sheet 18 by the eraser 54, the stimulable phosphor sheet 18 is stored back again into the cassette 102 in the second cassette holding position P2.

Then, the lid 22 of the cassette 102 is closed, and thereafter the cassette 102 is displaced a predetermined distance toward the cassette unloading slot 104 in the direction indicated by the arrow C by the sliding displacement mechanism 24. The cassette 102 stops being displaced when it reaches a position facing the cassette unloading slot 104. The cassette 102 storing the stimulable phosphor sheet 18 whose radiation image information has been read and erased is now placed, together with other cassettes 102*a*, in the cassette unloading slot 16. The operator can now remove the cassettes 102, 102*a* from the image reading apparatus 100 through the cassette unloading slot 104. As shown in FIG. 2, the cassette unloading slot 104 functions as a stock space having a width large enough to hold a plurality of cassettes 102, 102*a*.

According to the second embodiment, as described above, it is possible for the cassettes 102, 102*a* holding respective stimulable phosphor sheets 18 from which radiation image information has been read and erased in the image reading apparatus 100, to be successively discharged into the cassette unloading slot 104. Therefore, the operator does not need to remove one of the cassettes 102, 102*a* every time. Instead, since the cassette unloading slot 104 can hold a plurality of, e.g., four, cassettes 102, 102*a* therein, the operator may remove all those cassettes 102, 102*a* at once after they have been placed together in the cassette unloading slot 104. As a result, the efficiency with which to read and erase radiation image information from stimulable phosphor sheets 18 in the image reading apparatus 100 is increased.

Figure 3:
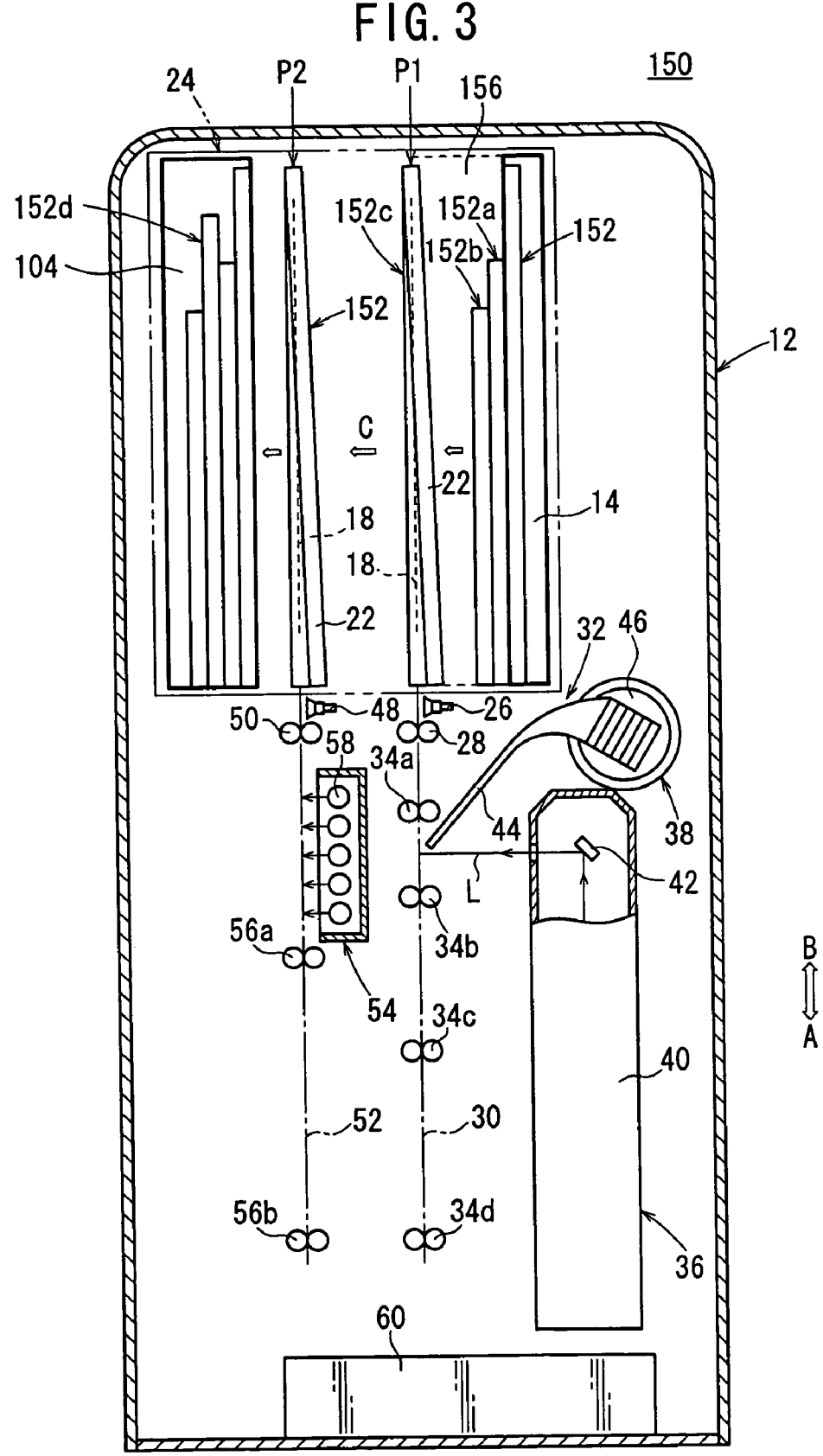
FIG. 3 is a schematic vertical cross-sectional view of an image reading apparatus according to a third embodiment of the present invention.

An image reading apparatus 150 according to a third embodiment of the present invention is shown in FIG. 3. Those parts of the image reading apparatus 150 which are identical to those of the image reading apparatus 10, 100 according to the first and second embodiments are denoted by identical reference characters, and will not be described in detail below.

The image reading apparatus 150 according to the third embodiment differs from the image reading apparatus 100 according to the second embodiment in that a plurality of cassettes 152 storing respective stimulable phosphor sheets 18 can successively be loaded through the cassette loading slot 14 and can be held together in the casing 12.

In the image reading apparatus 150, a cassette 152 loaded through the cassette loading slot 14 is displaced toward the cassette unloading slot 104 in the direction indicated by the arrow C by the sliding displacement mechanism 24, and is held in a holding space (holder) 156, indicated by the broken lines in FIG. 3, which is provided between the first cassette holding position P1 held in substantially vertical alignment with the first vertical feed path 30 and the cassette loading slot 14. The holding space 156 is large enough to hold a plurality of, e.g., four, cassettes 152 at the same time. The holding space 156 holds an array of successive cassettes 152 that have been loaded through the cassette loading slot 14. Stated otherwise, two cassettes 152a, 152b, for example, which are held in the holding space 156 as shown in FIG. 3 are waiting for being delivered to the first cassette holding position P1 from which respective stimulable phosphor sheets removed from the cassettes 152a, 152b will be sent to and processed by the reader 32 to read recorded radiation image information therefrom.

The cassettes 152a, 152b held in the holding space 156 are then successively moved to the first cassette holding position P1 by the sliding displacement mechanism 24. At this time, the cassette 152b closer to the cassette unloading slot 104 is first moved. When the cassette 152b reaches the first cassette holding position P1 where it is represented as a cassette 152c in FIG. 3, the lid 22 thereof is opened by the lid opening mechanism (not shown), and the stimulable phosphor sheet 18 stored in the cassette 152c is taken out and fed along the first vertical feed path 30. While the stimulable phosphor sheet 18 is being fed along the first vertical feed path 30, recorded radiation image information is read therefrom by the reader 32.

The stimulable phosphor sheet 18 from which the recorded radiation image information has been read is stored back into the cassette 152c in the first cassette holding position P1. Then, the cassette 152c is moved toward the cassette unloading slot 104 in the direction indicated by the arrow C by the sliding displacement mechanism 24 for erasing process. The next cassette 152a that has been waiting in the holding space 156 is moved by the sliding displacement mechanism 24 to the first cassette holding position P1 from which a stimulable phosphor sheet 18 removed from the cassette 152a will be sent to and processed by the reader 32 to read recorded radiation image information therefrom.

The cassette 152 which stores the stimulable phosphor sheet 18 from which the recorded radiation image information has been read is delivered to the second cassette holding position P2. Then, the stimulable phosphor sheet 18 is removed from the cassette 152 in the second cassette holding position P2 and fed along the second vertical feed path 52. While the stimulable phosphor sheet 18 is being fed along the second vertical feed path 52, remaining radiation image information is erased from the stimulable phosphor sheet 18 by the eraser 54.

The stimulable phosphor sheet 18 from which the remaining radiation image information has been erased is stored back into the cassette 152 in the second cassette holding position P2. The cassette 152 is then displaced from the second cassette holding position P2 to the cassette unloading slot 104.

The image reading apparatus 150 thus constructed is capable of holding a succession of cassettes 152 that have been loaded through the cassette loading slot 14 in the holding space 156 in the casing 12 for keeping respective stimulable phosphor sheets 18 stored in those cassettes 152 in readiness for being processed by the reader 32 to read recorded radiation image information therefrom. Since the image reading apparatus 150 can be loaded with a plurality of cassettes 152 simultaneously in advance, the image reading apparatus 150 can read and erase radiation image information from those stimulable phosphor sheets 18 more efficiently than if the image reading apparatus is loaded with one cassette at a time.

As with the image reading apparatus 100 according to the second embodiment, the cassette unloading slot 104 has an increased width large enough to store a plurality of, e.g., four, cassettes 152, 152a through 152d simultaneously therein. Consequently, those cassettes 152, 152a through 152d that contain respective stimulable phosphor sheets 18 from which radiation image information has been read and erased can be stocked in the cassette unloading slot 104 until the cassette unloading slot 104 becomes full. It is not necessary for the operator to remove the cassette out of the casing 12 through the cassette unloading slot 104 each one of those cassettes 152, 152a through 152d is discharged into the cassette unloading slot 104. Rather, the operator can efficiently remove all the cassettes 152, 152a through 152d together through the cassette unloading slot 104 after they have been placed in the cassette unloading slot 104.

Although certain preferred embodiments of the present invention have been shown and described in detail, it should be understood that various changes and modifications may be made therein without departing from the scope of the appended claims.

What is claimed is:

1. An image reading apparatus for applying a scanning radiation to a radiation image recording medium to read recorded radiation image information therefrom, comprising:

a casing;

a cassette loader disposed in said casing for being loaded with a cassette for storing the radiation image recording medium therein;

a first feed path disposed in said casing for feeding the radiation image recording medium removed from said cassette;

a reader disposed along said first feed path for reading the recorded radiation image information recorded in said radiation image recording medium;

a second feed path disposed in said casing substantially parallel to said first feed path, for feeding the radiation image recording medium;

an eraser disposed along said second feed path for erasing remaining radiation image information from said radiation image recording medium;

a cassette unloader disposed in said casing for being unloaded with the cassette storing said radiation image recording medium from which the recorded radiation image information has been read by said reader and the remaining radiation image information has been erased by said eraser; and a delivery mechanism for delivering said cassette from a first cassette holding position which faces said first feed path for holding said cassette storing said radiation image recording medium from which the recorded radiation image information is to be read by said reader, to a second cassette holding position which faces said second feed path for holding said cassette storing said radiation image recording medium from which the remaining radiation image information is to be erased by said eraser.

2. An image reading apparatus according to claim 1, wherein said cassette unloader stores a plurality of cassettes storing respective radiation image recording mediums from which the remaining radiation image information has been erased by said eraser.

3. An image reading apparatus according to claim 2, wherein said first cassette holding position and said second cassette holding position are disposed between said cassette loader and said cassette unloader.

4. An image reading apparatus according to claim 3, further comprising:

a holder disposed in said casing for holding said cassette, said holder being disposed between said cassette loader and said first cassette holding position.

5. An image reading apparatus according to claim 4, wherein said holder is disposed in a space having a capacity large enough to hold a plurality of cassettes therein.

6. An image reading apparatus according to claim 1, wherein said first cassette holding position faces said cassette loader, and said second cassette holding position faces said cassette unloader.

7. An image reading apparatus according to claim 1, wherein said cassette loader is loaded with said cassette, and, simultaneously, said cassette unloader is unloaded with a cassette other than said cassette.

8. An image reading apparatus according to claim 7, wherein said casing is made of a shield material capable of blocking the transmission of a radiation therethrough, and said cassette is stored in said casing.

* * * * *